UNITED STATES PATENT OFFICE.

JACOB REEDER, OF FRESNO CITY, CALIFORNIA.

INSECTICIDE.

SPECIFICATION forming part of Letters Patent No. 413,732, dated October 29, 1889.

Application filed February 11, 1889. Serial No. 299,462. (No specimens.)

*To all whom it may concern:*

Be it known that I, JACOB REEDER, a citizen of the United States, residing at Fresno City, county of Fresno, State of California, have invented a new and useful composition of matter to be used in the extermination and destruction of insect pests of all kinds which live or feed upon trees, shrubs, fences, plants, &c., or which infest houses, closets, pantries, cupboards, bins, store-rooms, &c., of which the following is a specification.

My composition consists of the following ingredients, combined in the following proportions, to wit: one gallon of common home-made soft soap, one gallon of kerosene-oil, and four ounces of lime. These three ingredients are to be boiled together for half an hour, then set off to cool, and at once add one ounce of oil of pennyroyal and one ounce of oil of eucalyptus. When this mixture has cooled half an hour, add three pints of lime and three pints of wood-ashes, whereupon the whole substance will become a powder. This powder forms the basis of future operations.

To free fruit or ornamental trees, bushes, shrubs, and vegetation of all kinds infested with scale, lice, ants, or insects of any and every kind, take one gallon of water, one pound of sulphur, one-half pound of lime, and boil until well mixed; then slake three pounds of lime, and add two ounces of salt while slaking, pouring in water enough to keep it thin, and to this add the mixture of lime and sulphur boiled together, as above directed, and to this compound stir in from six to ten table-spoonfuls of the composition, and reduce the mixture to a thin spray by adding water. It would be well before using to strain through a piece of coarse cloth. Spray the whole tree—trunk and utmost branches—thoroughly; but if the tree is too high to reach by a spray a little below the surface of the ground cut a half square through the bark on the trunk of the tree, about two and a half inches each way, raise the bark or dog-ear so made, and insert one tea-spoonful of the composition mixed with the above-prepared spray to the consistency of batter. Inoculate the tree on opposite sides.

If the tree has borers, whitewash the trunk of the tree as high up as the branches with the spray mixture prepared as heretofore directed, and thicken with lime or wood-ashes to the consistency of whitewash, adding two table-spoonfuls of the composition more to one gallon of the mixture, puncturing the bark in several places around the tree.

For lice and mites on fowls, to every dozen grown hens take one-half tea-spoonful of the composition and one table-spoonful of good sulphur mixed well together, sieved in soft food, and feed to the hens twice a week for three weeks, and thereafter once in two or three months; also, sprinkle in each nest the composition and sulphur, mixed in equal quantities, to the amount of one tea-spoonful twice a week for three weeks; also, whitewash or spray the perches and inside of hen-house with common whitewash to which has been added two or three table-spoonfuls of the composition to one gallon of whitewash or spray. The tree-spray does well for the hen-house.

To keep ants, cockroaches, &c., from cupboards, pantries, closets, &c., sprinkle the composition where the vermin frequent.

Safes and movable furniture can be kept entirely free from all crawling things by placing the piece of furniture a little distance from the wall and putting a tin cover two inches deep and three or four inches in diameter, into which has been placed a table-spoonful or two of the composition, around each leg.

Carpets can be kept entirely free from moths, &c., by sprinkling a little of the composition over the carpet and sweeping it around so that every portion of the carpet is permeated with the powder.

Beds can be kept free and clean of bedbugs by mixing one-half pint of coal-oil, one-fourth of a pint of turpentine, and one table-spoonful of the composition and applied with a rag or feather to the cracks and crevices of the woodwork.

Ants can be killed readily by pouring the above mixture into their burrows.

I am not aware that the above composition or any combination of any of its ingredients in the proportions mentioned above or in any proportions have been used together or separately by any one or that any patent has ever been applied for or granted to any person for said composition. The same is my own discovery, on which I have been experimenting for many years.

What I claim, and desire to secure by Letters Patent of the United States, is—

The herein-described composition of matter to be used for the extermination and destruction of insect pests of all kinds which live or feed upon trees, shrubs, fences, plants, or which infest houses, closets, pantries, cupboards, bins, store-rooms, &c., consisting of soft soap, kerosene-oil, lime, oil of pennyroyal, oil of eucalyptus, wood-ashes, sulphur, and salt, in the proportions specified.

JACOB REEDER.

Witnesses:
PHILIP STEWART,
R. L. DIXON.